Aug. 6, 1946.        H. S. CAMPBELL        2,405,188
CONTROL SYSTEM FOR ROTATIVE WINGED AIRCRAFT
Filed July 5, 1941        2 Sheets-Sheet 1

INVENTOR
Harris S. Campbell
BY
Synnestvedt & Lechner
ATTORNEYS

Aug. 6, 1946.   H. S. CAMPBELL   2,405,188
CONTROL SYSTEM FOR ROTATIVE WINGED AIRCRAFT
Filed July 5, 1941   2 Sheets-Sheet 2
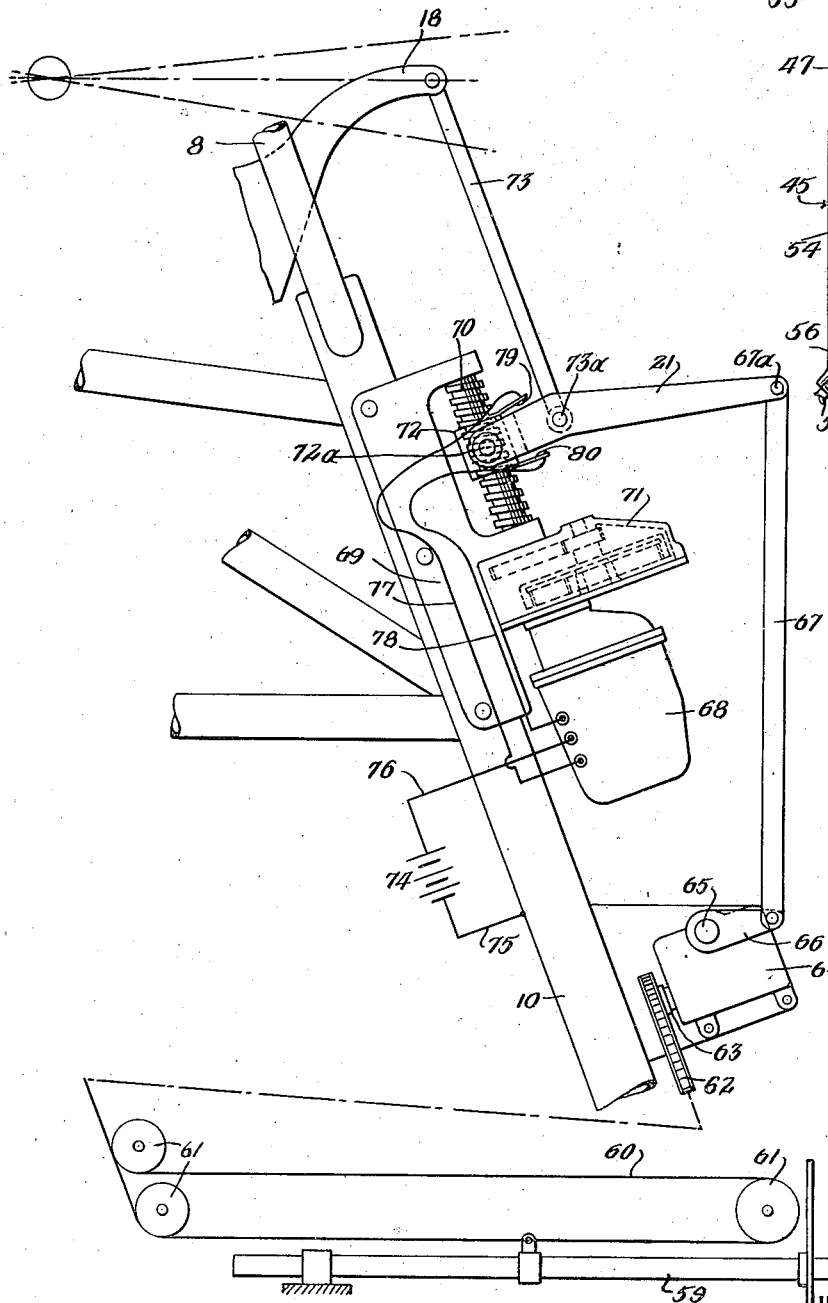
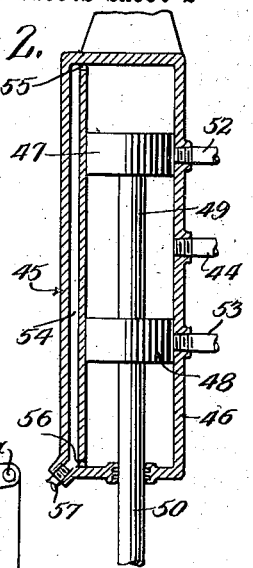
INVENTOR
Harris S. Campbell
BY
ATTORNEYS Patented Aug. 6, 1946

2,405,188

UNITED STATES PATENT OFFICE 2,405,188

CONTROL SYSTEM FOR ROTATIVE WINGED AIRCRAFT

Harris S. Campbell, Bryn Athyn, Pa., assignor to Autogiro Company of America, Philadelphia, Pa., a corporation of Delaware Application July 5, 1941, Serial No. 401,156

12 Claims. (Cl. 244—17)

This invention relates to a control system for rotative winged aircraft. The invention is concerned with that general class of control systems in which the sustaining rotor itself is employed for control purposes.

In aircraft of this type, the sustaining rotor (or rotors) is either mounted for tilting movement as a whole or is arranged so that the blades of the rotor are capable of pitch variation, the control moment, in either case, resulting from shift of the lift line of the rotor with respect to the center of gravity of the aircraft. Such rotor control is employed principally as a flight control determining the flight attitude of the aircraft. The invention is applicable to aircraft having rotor control whether the rotor is normally aerodynamically actuated in flight, or is normally mechanically driven in flight.

One of the primary objects of the invention is the provision of a control system incorporating power means arranged to relieve the pilot of a portion of the rotor loads and reduce the effort required in maneuvering. At the same time the invention has in view retaining control "feel," by arrangement of the control system so as to permit a portion of the rotor loads to be transmitted to the manually operable member, such as a joy stick.

Both of the points mentioned in the preceding paragraph (relieving the pilot of loads, and retaining "feel") are of substantial importance because of the very fact that the rotor which is used as the medium of control constitutes the primary or sole means of sustension for the aircraft. While the invention may advantageously be used in any rotative winged aircraft having rotor control, because of the considerations just mentioned it is especially useful in rotative winged aircraft of relatively large size or in which heavy rotor loads would otherwise be imposed on the control system.

Another object of the invention is the provision of a servo control system, retaining "feel," which is further capable of direct manual operation in the event of failure of the servomotor, and this without the necessity for any alteration of the mechanism.

In accordance with another aspect of the invention, provision is made for a limited range of purely manual control before the operation of the servomotor is initiated. The control is, therefore, keenly sensitive to aerodynamically induced displacements of the rotor, the pilot being immediately apprised of any such displacement without, however, imposing heavy control loads on the hand of the pilot during an aerodynamically induced displacement of the rotor beyond said limited range. This limited range of movement of the controls independent of the servomotor is also advantageous in eliminating "hunting" under the influence of the action of the servomotor. Excessive wear of the parts is thus also reduced.

How the foregoing and other objects and advantages are attained will be apparent to those skilled in the art from the following description, referring to the accompanying drawings, in which—

Figure 2 is a sectional view of a fluid pressure control valve employed in the system of Figure 1; and Figure 3 is a view of certain parts shown in Figure 1 but with a modified control system applied.

Figure 1:
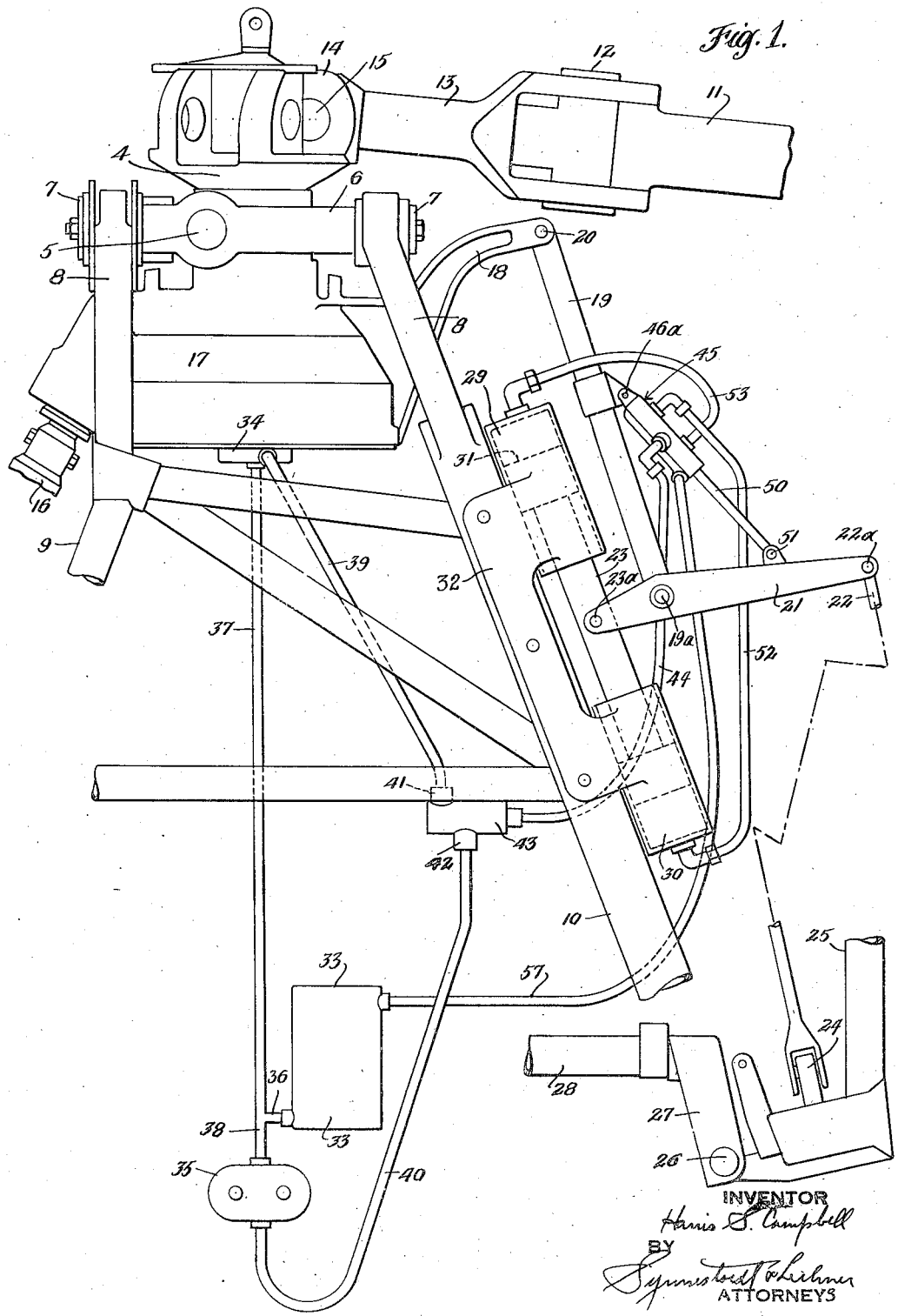
Figure 1 is a side elevational view of portions of a rotor mount, rotor hub and blade, with the control system of the present invention applied thereto.

As herein illustrated, the invention is shown as applied to a sustaining rotor having a hub which is pivoted for tilting movement in all directions for control purposes. Thus, the hub 4 is pivotally mounted by trunnions 5 within a ring 6, which ring is, in turn, pivotally mounted on trunnions 7—7 in a fixed frame 8—8 supported at the top of a pylon structure 9—10. Trunnions 5 provide an axis for tilting the hub and thus the rotor as a whole in a fore and aft direction, while trunnions 7—7, being disposed fore and aft of the aircraft, provide for tilting of the rotor to one side or the other. A rotor control of this general type is fully disclosed in copending application of Juan de la Cierva, Serial No. 645,985, filed December 6, 1932.

The root end of a blade appears at 11, the same being coupled by a "drag" pivot 12 with an extension link 13 which, in turn, is connected with the hub lugs 14 by means of a "flapping" pivot 15. While only one blade is shown it will be understood that the rotor preferably incorporates a plurality of such blades. Provision may be made for driving the rotor, as by a drive shaft 16 connected with gearing housed at 17. Although the rotor here shown is of the type adapted for aerodynamic or autorotational actuation in normal flight, the drive mechanism may be employed for initiating rotation of the rotor on the ground prior to take-off in the manner disclosed, for example, in copending application of Juan de la Cierva, Serial No. 738,349, filed August 3, 1934, now Patent No. 2,380,583, issued July 31, 1945. At some convenient point in the rotor drive system, for example, in the shafting 16, a manually operable clutch is interposed and, in addition, to ensure free rotation of the rotor in normal flight an overrunning clutch is desirably interposed between the rotor drive gearing housed at 17 and the rotative hub spindle itself.

In considering the control system, it is first pointed out that in accordance with the invention provision is preferably made for employment of a duplicate set of various of the control parts hereinafter described, one set being arranged in the manner illustrated for the purpose of controlling the tilting of the rotor about the transverse axis of trunnions 5, and the other set being employed for lateral tilt of the rotor, this latter set not being illustrated.

A control arm 18 projects rearwardly from housing 17, and to this arm there is connected a push-pull element 19, the connection 20 desirably taking the form of a universal or ball coupling so as to accommodate lateral tilting of the rotor about the axis of trunnions 7—7. At its lower end push-pull element 19 is pivoted at 19a to a beam or lever 21. This lever is adapted to be moved upwardly or downwardly by a push-pull tube 22 and also by piston rod 23 which are connected with the lever at opposite ends, at 22a and 23a, respectively. Push-pull tube 22 extends downwardly for attachment at 24 with the pilot's control stick or member 25 which is pivotally mounted for fore and aft movement at 26. Pivot 26 is carried by an arm 27 depending from rockshaft 28 which latter, as will be understood by those skilled in the art, is adapted for connection with a lateral rotor control, actuable by movement of the control stick from side to side, and which may conveniently be coupled to ring 6 of the rotor mount.

The ends of piston rod 23 project respectively into upper and lower fluid pressure cylinders 29 and 30, and the ends are equipped with pistons 31. The cylinder and piston devices 29, 30, 31 constitute a servomotor for applying a controlling force to the rotor control element 19. The cylinders 29 and 30 are mounted by bracket 32 on the rotor support or pylon 10, which thus constitutes a fixed reaction base to which a portion of the rotor loads is transmitted.

The fluid pressure supply and control for the servomotor are as follows:

A fluid reservoir (oil preferably being used) is shown at 33. The reservoir supplies oil to the intake sides of pumps 34 and 35 through pipes 36, 37 and 38. Pump 34 is geared or otherwise driven from the rotative part of the hub, while pump 35 is similarly adapted to be driven from the aircraft engine (not shown). The discharge or pressure connections 39 and 40 of the two pumps are provided with check valves 41 and 42 and deliver into a fitting 43 from which a pipe 44 transmits the pressure to the control valve indicated generally at 45.

Two sources of pressure, i. e., the two pumps 34 and 35, are employed in order to positively assure availability of fluid pressure for operation of the control system under all conditions. Thus, failure of the engine will not impair the supply, nor will failure of either of the pumps. Check valves 41 and 42 prevent loss of pressure produced by one pump in the event of failure of the other, or when the other is not operating.

As seen in Figure 2, the control valve 45 consists of a cylinder 46 with a double headed piston 47—48 working therein, the piston heads being interconnected by a stem 49 and having a piston rod 50 projecting from one end of the cylinder for connection with lever 21 as at 51 (see Figure 1). Cylinder 46 is pivotally connected at 46a with push-pull element 19.

From Figure 2 it will be noted that the pressure pipe 44 communicates with cylinder 46 intermediate the two piston heads 47—48. Pipes 52 and 53, also communicating with the cylinder 46, are extended respectively to the lower and upper cylinders 30 and 29 of the servomotor.

A passage 54 formed at one side of the control valve cylinder 46 is placed in communication with opposite ends of the cylinder through ports 55 and 56, passage 54 also being coupled by pipe 57 with the fluid reservoir 33 (see Figure 1).

From the foregoing description of the servomotor and its control valve, it will be seen that movement of the pilot's control stick 25, for example, forwardly, will raise point 22a on lever 21 about point 23a as a fulcrum, thereby moving stem 50 of the control valve upwardly and placing pipes 44 and 52 into communication with each other in the space between the two piston heads of the control valve, and at the same time placing pipe 53 in communication with return line 57. This results in admission of pressure to the lower end of the servomotor cylinder 30, and exhaust of pressure from the upper end of servomotor cylinder 29, thereby effecting upward movement of piston rod 23 of the servomotor. After a given displacement of the pilot's control stick 25, point 22a on lever 21 is maintained substantially fixed, so that the upward movement of piston rod 23 not only actuates the rotor control element 19 but also causes the lever 21 to move angularly in a direction to withdraw stem 50 from the control valve 45 and thus bring the pistons 47 and 48 back to the mid position shown in full lines in Figure 2, in which position the pressure line 44 and the return line 57 are cut off from the servomotor cylinders. The adjusted position of the control system is thereby maintained until a new adjustment is made by the pilot.

A similar but inverted action takes place upon movement of the pilot's control stick 25 in the opposite direction.

It will be understood that various of the fluid pressure connections, such as those indicated at 44, 52, 53 and 57 are flexible so as to accommodate the movement of the control valve described.

The structure and operation above described are of particular advantage for several reasons, as follows:

In the first place, it will be observed that point 19a on beam 21 is located closer to point 23a than is point 22a. In consequence of this, aerodynamically induced loads coming down from the rotor through push-pull element 19 are carried in large part through the servomotor to the fixed reaction base thereof, such as the pylon member 10, only a minor fraction (for example, one-quarter) of such loads being transmitted through the push-pull member 22 to the pilot's control stick 25. In this way the forces transmitted to the pilot's hand are greatly reduced, while at the same time the "feel" of the rotor is retained.

When the control is actuated by the pilot, only a minor fraction of the required control force need be supplied by the pilot's hand, the balance of the force (about three-quarters, in the example given) being supplied by the servomotor.

Since the axial dimension of pistons 47 and 48 of the control valve 45 is somewhat greater than the corresponding dimension of the ports through which pipes 52 and 53 communicate with cylinder 46, a limited range of movement between the piston stem 50 and the cylinder 46 is provided before operation of the servomotor is initiated. "Hunting" and consequent excessive wear of the parts are thereby avoided and, in addition, within the intermediate limited range just mentioned, the pilot's control is highly sensitive to any displacements of the rotor which may be set up as a result of wind gusts or other irregular flight conditions. In the event of a substantial rotor displacement in any direction, after the slight initial control stick movement permitted by said limited intermediate range, the servomotor will automatically come into operation in a sense to oppose the displacement of the rotor.

It is also to be observed that the servomotor and the operating connections between the pilot's control member and the rotor are arranged so that in case of failure of the servomotor, manual operation of the control system will not be impaired. In this event, the range of movement of the pilot's control stick for a given rotor displacement will be substantially greater than with the servomotor operating, but the pilot will still have available manual control which is adequate for safe operation or landing.

The arrangement of the rotor and rotor mount as shown in the modification of Figure 3 is similar to that of Figure 1. In Figure 3, however, a different type of pilot's control member is employed, i. e., a hand wheel 58 which may be mounted in the general manner disclosed in copending application of Agnew E. Larsen, Serial No. 209,511, filed May 23, 1938, now Patent No. 2,273,051 issued February 17, 1942. Thus, the wheel has an axis member 59 which is adapted for axial movement as well as rotation, the axial movement being transmissible to a closed circuit cable 60 passing over appropriate guide pulleys 61 and incorporating a length of chain 62 adapted to engage a sprocket mounted on a worm shaft 63 extended into worm unit 64. This unit comprises a worm (not shown) mounted on shaft 63, and a cooperating worm wheel connected with shaft 65, which shaft also carries arm 66 for actuating push-pull member 67. The worm unit, though preferably providing some mechanical advantage for the pilot, is designed for reverse transmission of forces therethrough, as in said copending application of Agnew E. Larsen. It will also be understood that another cable system including a worm unit may be associated with hand wheel 58 for actuation by rotation of said hand wheel, as in said copending Larsen application.

The servomotor of Figure 3 takes a different form than that shown in Figure 1. In Figure 3 a rotative reversible electric motor 68 is mounted on the pylon member 10 by a bracket 69, the motor being connected with threaded rod 70 through reduction gearing housed at 71. A threaded block 72 cooperates with rod 70 and is connected with lever 21 by a pivot 72a. The opposite end of lever 21 is coupled with push-pull member 67 as at 67a and the rotor control element 73 is coupled with the lever as at 73a.

A source of current for operating the motor 68 is indicated diagrammatically at 74, the same being grounded through connection 75. Wire 76 couples the opposite side of the current source with the motor, and for reverse operation of the motor the two connections 77 and 78 extend therefrom to contacts 79 and 80 disposed in spaced relation one above and the other below the lever 21. Thus, upon angular movement of lever 21, one or the other of the motor circuits is completed (through "ground"), so as to provide for rotation of the motor in one direction or the other.

Operation of the arrangement of Figure 3 is similar to that described above. Upon displacement of the pilot's control wheel 58 in an axial direction, the worm unit 64 is actuated so as to move push-pull member 67 upwardly or downwardly, thus making contact at 79 or 80 and initiating operation of the reversible motor in the correct sense to effect the desired control. As before, the major portion of the rotor loads is transmitted to a fixed reaction base, although, at the same time, the "feel" of the controls is retained.

I claim:

1. In an aircraft having a sustaining rotor constituting the principal lifting means for the craft, and a rotor mounting pylon adapted to carry the loads between the craft and the rotor, a control system operative on said rotor to shift the lift line thereof whereby to control the attitude of the aircraft in flight, said control system including a rotor control element subject to rotor loads and movable under the influence thereof, a pilot's control member, reversible operating connections between said member and said element, a servomotor coupled with said connections and with said pylon as a fixed reaction base and providing a control force for supplementing that applied to the control member by the pilot, and control means for the servomotor actuable by manual movement of said operating connections, the servomotor and pylon assuming a portion of the rotor loads, the remainder being carried by said operating connections to the pilot's control member.

2. A construction in accordance with claim 1 in which the operating connections include a lever connected with the rotor control element, with the pilot's control member and with a movable part of the servomotor, the three points of connection being geometrically disposed to provide mechanical advantage for the pilot in making manual adjustments, whereby the servomotor supplies more than half of the total control force required for a given displacement and more than half of the control reaction loads are taken by the pylon when said motor goes into operation.

3. An aircraft sustaining rotor control system including a rotor control element subject to rotor loads and movable under the influence thereof, a pilot's control member, mechanism interconnecting said element and said member including a servomotor arranged to assume a portion only of the rotor loads, the remainder of said loads being carried by said mechanism to the pilot's control member, and means whereby said servomotor derives power from the rotor upon which it acts.

4. In an aircraft having a sustaining rotor constituting the principal lifting means for the craft, a control system operative on said rotor to shift the lift line thereof whereby to control the attitude of the aircraft in flight, said control system including a fluid pressure actuable servomotor, a fluid pressure pump driven by the rotor and adapted to supply fluid pressure for operation of said motor, and a fluid pressure pump driven by the aircraft engine and also adapted to supply fluid pressure for operation of said motor.

5. In an aircraft having a sustaining rotor constituting the principal lifting means for the craft, a control system operative on said rotor to shift the lift line thereof whereby to control the attitude of the aircraft in flight, said control system including a rotor control element movable in each of two opposite directions and subject to rotor loads, said element being movable under the influence of said loads, a servomotor for moving said element in either of said two opposite directions comprising a reversible rotative motor one part of which is mounted on a relatively fixed reaction base, a screw rotatable by said motor, a threaded block associated with said screw and movable axially of the screw upon rotation of the latter, a lever interconnecting the rotor control element and said block, a pilot's control member movable in either of two opposite directions, reversible operating connections between the pilot's control member and said lever, and control means for the servomotor associated with said lever and actuable upon angular movement thereof in one direction or the other to initiate operation of said motor in one direction or the other.

6. A construction according to claim 3, together with a rotor mount on which the servomotor is supported close to the rotor, whereby the transmission of power to the motor is shortened while at the same time the rotor load reaction on the servomotor is taken by said rotor mount.

7. In a rotary-wing aircraft comprising a fuselage and a rotor tiltable with respect thereto, mechanism for tilting the rotor which includes in combination: a rigid pylon structure for mounting the rotor upon the body of the craft and serving also as a machinery base; a servomotor mounted on said pylon as a base, and having a part which moves in a direction lengthwise of the pylon when the motor is actuated; a floating lever having one end pivotally connected to said motor part; a reversible connection from the rotor pivotally connected to the floating lever adjacent the motor end thereof; a control member in the fuselage having a reversible connection pivotally coupled to the other end of the floating lever; a power source connected to deliver driving energy to the servomotor; and a monitor device governing the flow of energy to the motor and mounted for actuation by the floating lever upon movement of said lever beyond a limited idle range, whereby said motor is actuated upon substantial aerodynamic displacements of the rotor to correct the same, as well as upon normal displacements of the control member to effect the purpose thereof, and in either case the major control loads are carried by the rotor mounting pylon.

8. The combination set forth in claim 7 in which the power source connected to deliver driving energy to the servomotor is the rotor.

9. The combination set forth in claim 7 in which the power source connected to deliver driving energy to the servomotor is the rotor, and in which a coadjuvant power source driven from the aircraft engine is also connected to supply driving energy to the servomotor.

10. In an aircraft having sustaining rotor means constituting its principal lifting agency, a control system operative on said rotor means to shift the lift line thereof whereby to control the attitude of the aircraft in flight, said control system including a fluid pressure actuable servomotor, a fluid pressure pump driven from the rotor means and adapted to supply fluid pressure for operation of said motor, and a fluid pressure pump driven by the aircraft engine and also adapted to supply fluid pressure for operation of said motor, together with a pilot's control element in the body of the craft having control connections adapted to monitor the operation of said motor, and connected to receive at least a portion of the rotor thrusts.

11. In an aircraft having main sustaining rotor means, power means for rotating said rotor means, and mounting structure for the rotor means including an aircraft body and rotor mounting means extending therefrom, the combination of: a control connection subject to rotor loads and movable under the influence thereof and operative to shift the lift line of the rotor means whereby to control the craft in flight; and a control system, including motor means coupled to react between said connection and the mounting structure to apply a control force to the former and to react against the latter; a pilot's control member in the craft; and a motor control linkage coupled to said pilot's control member, said linkage also being coupled to transmit a portion of the rotor loads between said connection and said pilot's control member, elements of said control system including said linkage being constructed to be operative upon the rotor means whether or not the power means for rotating said rotor means is in operation.

12. In an aircraft, sustaining rotor means constituting the principal lifting agency, power drive means for said rotor means, a disconnecting device between said two means whereby the rotor means may autorotate upon power disconnection or failure, and a control system operative on said rotor means to shift the lift line thereof whereby to control the attitude of the aircraft in flight, said control system including a fluid-pressure-actuable servomotor, a fluid pressure pump driven by the rotor and adapted to supply fluid pressure for operation of said motor, and a fluid pressure pump driven from the aircraft engine independently of the position of said disconnecting device, said last named pump being also adapted to supply fluid pressure for operation of said motor.

HARRIS S. CAMPBELL.